July 3, 1945.   F. GRAVES   2,379,705
PORTABLE ELECTRIC HEATER
Filed Nov. 19, 1943
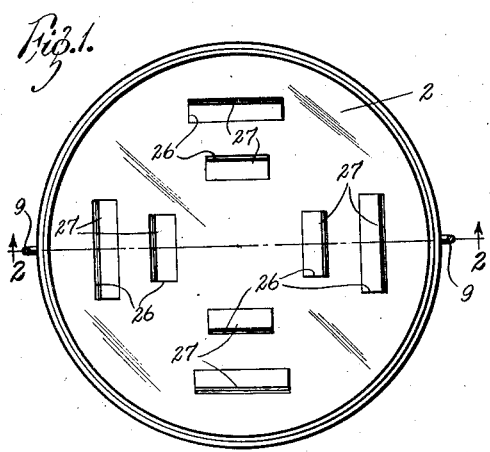
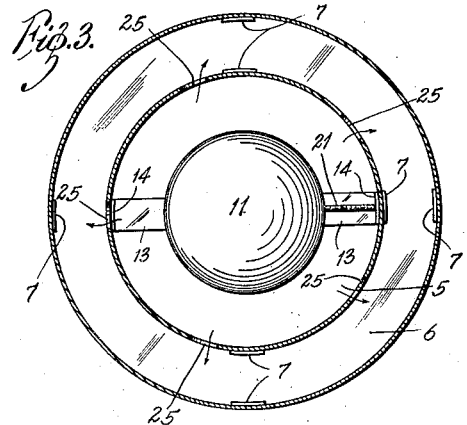
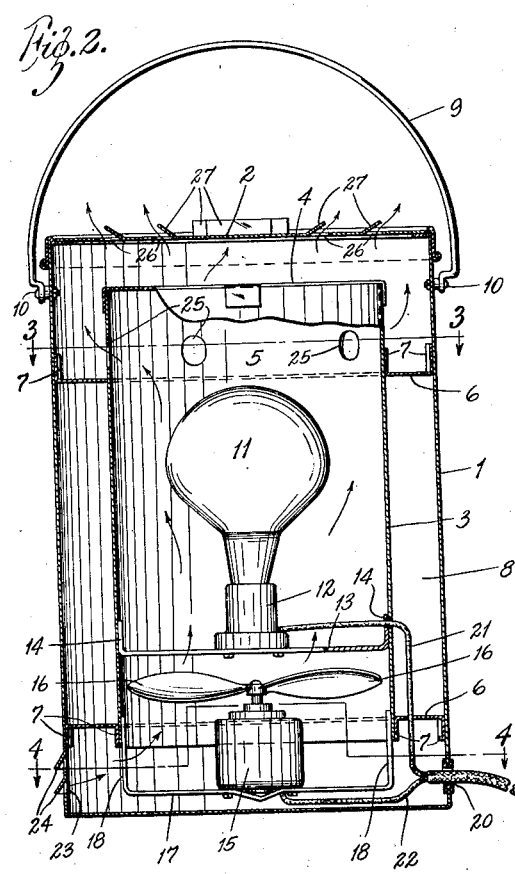
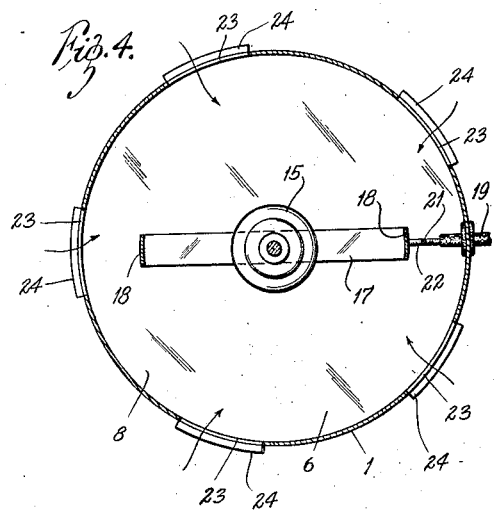
INVENTOR:
Frederick Graves,
by Cantlan & Gravely,
HIS ATTORNEYS.

Patented July 3, 1945

2,379,705

UNITED STATES PATENT OFFICE 2,379,705

PORTABLE ELECTRIC HEATER

Frederick Graves, St. Louis, Mo.

Application November 19, 1943, Serial No. 510,889

3 Claims. (Cl. 219—39)

This invention relates to portable electric heaters. It has for its principal objects to devise a simple and efficient, economical and compact lightweight portable electric heater that will utilize an incandescent bulb as an air heating agent and that will provide for forced circulation of the heated air. The invention consists in the portable electric hot-air heater and in the construction, combinations and arrangements of parts hereinafter described and claimed.

In the accompanying drawing, which forms part of this specification and wherein like symbols refer to like parts wherever they occur, Fig. 1 is a plan view of a portable electric hot-air heater embodying my invention, Fig. 2 is a central vertical sectional view through said heater on the line 2—2 in Fig. 1, Fig. 3 is a horizontal cross-sectional view on the line 3—3 in Fig. 2; and Fig. 4 is a horizontal cross-sectional view on the line 4—4 in Fig. 2.

My portable electric hot-air heater comprises an upright cylindrical sheet metal outer casing or housing 1 having a permanently closed bottom and a removable top in the form of a slip cover 2. Mounted in the cylindrical outer casing 1 concentric therewith and spaced inwardly therefrom is an inner cylindrical sheet metal air heating housing 3 that terminates short of the upper and lower ends of said outer casing and has an open bottom and a removable top in the form of a slip cover 4.

The inner housing 3 forms a downwardly opening air heating chamber 5 and is supported in the outer enclosing housing 1 by means of annular upper and lower plates 6 interposed between the side walls of said housings. Each of the annular housing spacing plates 6 have a series of vertically disposed circumferentially spaced tabs or lugs 7 along their inner and outer peripheral edges that are welded or otherwise permanently secured to the side walls of the respective inner and outer housings. The lowermost annular housing connecting plate is located near the lower end of the inner housing 3, and the uppermost annular plate is located adjacent to but below the top of said housing, the two annular plates cooperating with the side walls of the inner and outer housings to form a substantially closed annular air chamber 8 therebetween. The heater is provided with a curved carrying handle or bail 9 which embraces the outer housing 1 and has its ends pivotally secured, as at 10, to the side wall thereof just below the cover 2 therefor.

The electric heating element of my portable electric hot-air heater preferably comprises a gas-filled tungsten-filament radiant heat lamp 11. This lamp is located in the air heating chamber 5 of the inner housing centrally thereof and is threaded into an upwardly opening socket member 12 that is mounted on a cross-strap 13 that extends from side to side of said chamber along a diameter thereof and has upturned end portions 14 welded or otherwise permanently secured to the side wall of said inner housing.

Mounted in the lower portion of the heater, just below the supporting strap 13 for the lamp socket 12, is an electric air circulating fan including a motor 15 and fan blades 16 driven thereby and located thereabove. The motor 15 is supported coaxial with the open lower end of the inner housing 3 on a stirrup 17 that is disposed crosswise of said housing and has its ends 18 extended upwardly into and welded or otherwise permanently secured to the side wall of said housing. Current is supplied to the heat lamp 11 and to the motor 15 through a plug-in cord 19 which extends through an opening 20 in the side wall of the outer housing 1 and has branches 21 and 22 leading to the lamp socket 12 and fan motor 15, respectively.

The outer housing has a series of horizontally elongated circumferentially spaced rectangular air inlet openings 23 in the side wall thereof below the level of the open, lower end of the inner housing 3, said opening being preferably furnished with downwardly and outwardly inclined louvers 24. The inner housing 3 has a series of circumferentially spaced circular outlet openings 25 through the side wall thereof that are located near the top thereof and above the level of the uppermost annular connecting plate 6 for the housings 1 and 3. The removable cover or closure 2 for the upper end of the outer housing 1 is also provided with series of rectangular air outlet or discharge openings 26. The air discharge openings 26 are preferably provided with upwardly and outwardly inclined louvers 27 and are arranged in two series, the openings of the outer series being somewhat longer than the openings of the inner series.

In operation, the plug of the cord 19 is plugged into a convenient electric room socket, thus energizing the heat lamp 11 and operating the electric fan 16. The radiant heat from the lamp 11 is transferred to the side and top walls of the air heating chamber 5 by convexion and radiation; and the annular chamber 8 around said air heating chamber opposite said lamp forms a substantially dead air insulating space which reduces the transfer of heat through the side walls of the inner and outer housings. The fan 16 operates to draw air through the louvered inlet openings 23 in the lower portion of the outer housing 1 into the open, lower end of the air heating chamber 5 and force such air upwardly around the lamp 11 so as to be heated thereby and by the hot side and top walls of said chamber. The air thus heated in the chamber 5 thence flows from the upper portion thereof through the circular outlet openings 25 in the side wall thereof into the annular space between the inner and outer housings above the uppermost annular connecting plate 6 therefor and thence upwardly around the heated top 4 of the inner housing where it is discharged through the louvered discharge openings 26 in the top 2 of the outer housing. Thus, the air is continuously drawn in the bottom of the heater and discharged from the top thereof. The total cross-sectional area of all of the outlet openings 25 in the inner housing is less than the total cross-sectional area of the air inlet openings 23 in the outer housing 1 so as to throttle or retard the flow of air from the heating chamber 5 through said outlet openings, thus increasing the pressure of the air in said chamber and causing such air to become thoroughly heated before escaping through said openings. The tops of the inner and outer housings are removable so that access may be had to the heat lamp 11 and the air circulating fan.

What I claim is:

1. A portable electric heater comprising a cylindrical outer housing, a cylindrical inner housing mounted in said outer housing and spaced from the side, top and bottom thereof, said inner housing having a closed top and an open bottom, said outer housing having series of circumferentially spaced air inlet openings through its side below the level of the open bottom of said inner housing and having a series of air discharge openings in its top, said inner housing having a series of circumferentially spaced air outlet openings through its side adjacent to its top, an electric heat lamp located in said inner housing, an upright air circulating fan located in said heater at the open lower end of said inner housing, and annular plates interposed between and rigidly connecting the spaced side walls of said inner and outer housings above and below the level of said lamp and forming with said side walls a closed annular chamber below the level of the air outlet openings in the side wall of said inner housing.

2. A portable electric heater comprising an outer housing, an inner housing in said outer housing and spaced from the side, top and bottom thereof and having a closed top and an open bottom, said outer housing having a series of horizontally spaced air inlet openings through its side below the level of the open bottom of said inner housing and having a multiplicity of air discharge openings in its top, said inner housing having a series of horizontally spaced air outlet openings through its side adjacent to its top, an upright electric heat lamp located in said inner housing below the level of the air outlet openings in the side thereof, an upright air circulating fan located in said heater at the open lower end of said inner housing, and plates interposed between and rigidly connecting the spaced sides of said inner and outer housings above and below the level of said lamp and forming with said spaced sides a closed dead air chamber below the level of the air outlet openings in the side of said inner housing.

3. A portable electric heater comprising a cylindrical sheet metal outer housing having a removable top, a cylindrical sheet metal inner housing in said outer housing concentric therewith and spaced from the side, top and bottom thereof and having an imperforate removable top and an open bottom, said outer housing having a series of circumferentially spaced louvered air inlet openings through its side below the level of the open bottom of said inner housing and having a multiplicity of louvered air discharge openings in its removable top, said inner housing having a series of circumferentially spaced air outlet openings through its side adjacent to its removable top, an upright electric heat lamp located in said inner housing coaxial therewith, an upright air circulating fan located in said heater coaxial with the open lower end of said inner housing, and annular plates interposed between and rigidly connecting the spaced side walls of said inner and outer housings above and below the level of said lamp and forming with said side walls a closed annular chamber below the level of the air outlet openings in said side wall of said inner housing, the total cross-sectional area of said air outlet openings in said inner housing being less than the total cross-sectional area of said air inlet openings in said outer housing.

FREDERICK GRAVES.